United States Patent [19]

Plow

[11] 4,310,071
[45] Jan. 12, 1982

[54] GREASE FITTING CAP

[75] Inventor: Arthur E. Plow, Hammond, La.

[73] Assignee: TK Valve & Manufacturing, Inc., Hammond, La.

[21] Appl. No.: 59,654

[22] Filed: Jul. 23, 1979

[51] Int. Cl.³ ............................................. F16N 11/00
[52] U.S. Cl. .................................. 184/88 R; 184/94; 184/105 B
[58] Field of Search ............ 184/105 B, 105 A, 88 R, 184/88 A

[56] References Cited

U.S. PATENT DOCUMENTS

| 1,187,777 | 6/1916 | Parkinson | 184/94 |
| 1,685,378 | 9/1928 | Raeburn | 184/88 R |
| 2,587,000 | 2/1952 | Schluter | 184/88 R |
| 2,599,472 | 6/1952 | Miller | 184/88 A |

FOREIGN PATENT DOCUMENTS

| 1112355 | 8/1961 | Fed. Rep. of Germany | 184/105 B |
| 374279 | 6/1932 | United Kingdom | 184/105 B |

*Primary Examiner*—David H. Brown
*Attorney, Agent, or Firm*—Head & Johnson

[57] ABSTRACT

A grease fitting cap having a housing or body which is attachable to the head portion of a button-head grease fitting. A bolt member is threadably carried by the housing and is provided with an annular sealing member which may be tightened against the button-head portion and surrounding the port thereof, thereby sealing the port against leakage and contamination.

5 Claims, 5 Drawing Figures

U.S. Patent　　Jan. 12, 1982　　4,310,071
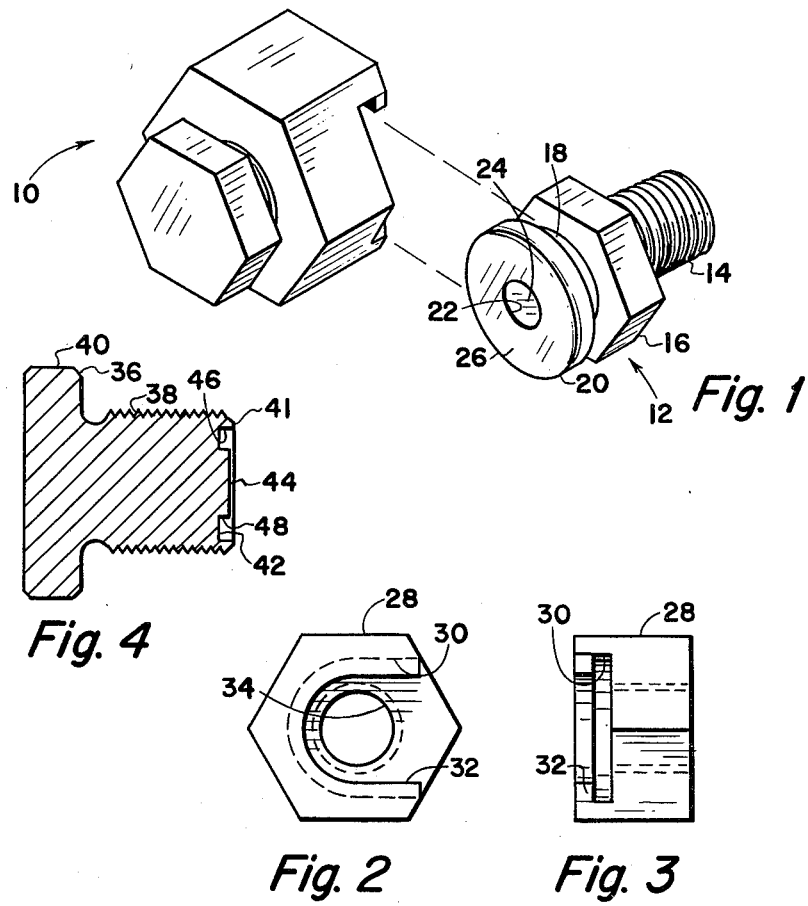

GREASE FITTING CAP

BACKGROUND OF THE INVENTION

1. Field of the Invention

The present invention relates to a sealing and protective cap for grease fittings and more particularly, but not by way of limitation, to a cap for sealing the port of a button-head grease fitting.

2. Background of the Invention

Throughout the industry there is equipment and machinery which requires internal lubrication, the lubrication being applied by way of grease zerts or fittings. Many such devices operate with high internal pressures such as valves, pumps and the like wherein the grease or lubrication fittings contain a check valve to maintain internal pressure.

To perform lubrication, one must force lubrication through the fittings with sufficient pressure to overcome the resistance of the check valve and the internal pressure, such lubrication being typically accomplished by way of a grease gun.

A typical grease fitting containing the check valve that is used in such application is the "button-head" grease fitting which is simply a hollow bolt like device having threaded shank which is threadably disposed in the port in the device requiring lubrication. The outer face of which contains a grease introduction port and a spring loaded check valve.

To apply lubrication, a grease gun is attached to the button-head portion of the fitting and the lubrication is injected with a force to overcome the spring of the check valve and the internal pressure of the device being lubricated.

Either through corrosion, deterioration of seals or the presence of foreign matter, the lubrication fitting will, over a period of time, develop a tendency to leak around the check valve through the grease introduction port.

In most instances, such a leak is unacceptable, and many times due to economics or even safety considerations, to shut down and replace the lubrication fitting is also unacceptable.

SUMMARY OF THE INVENTION

The present invention provides a grease fitting cap which is particularly designed and constructed to overcome the problems associated with leaks present in a grease fitting.

The grease fitting cap comprises a housing or body portion having a hollow cavity therein. This cavity is open to the side of the housing and is provided with an inwardly directed flange around the inner end thereof which is suitable for slipping over the button-head portion of a grease fitting. The flange portion grips the underside, the button-head portion of the fitting leaving the outer face or greased introduction port in communication with the cavity within the housing.

The housing further comprises a longitudinal threaded bore extending through the housing and in open communication with the cavity therein. The bore is situated so that when the housing is attached to the grease fitting, the threaded bore is coaxially aligned with the grease introduction port on the face of the button-head port of the fitting.

The cap further comprises a threaded bolt member having a hexagonal shaped bolt head at one end thereof suitable for operation with a wrenching device. The opposite end of the threaded bolt is provided with an annular O-ring groove for containing a sealing O-ring therein.

When the bolt is threadedly passed through the threaded bore in the housing, the O-ring may be brought into contact with the outer face of the button-head portion of the grease fitting whereby the O-ring surrounds the grease introduction port thereof. When the bolt is tightened against the button-head fitting, a seal is provided which will not only prevent leakage through the grease introduction port of the fitting, but will also prevent contaminants such as dust, fluid or other foreign particles from entering the grease fitting.

The annular O-ring groove at the end of the bolt portion of the cap is specially constructed to prevent blowout of the O-ring seal contained therein. The outer peripheral wall of the O-ring groove is wider than the inner periphery wall thereof, thereby preventing the O-ring from being popped out when it is placed into contact with the button-head portion of the grease fitting.

Stated another way, when the annular O-ring groove is cut into the end of the bolt portion of the cap fitting, the end face of the bolt inside the groove is slightly recessed, thereby making the outer wall of the groove wider than the inner wall.

Utilization of the grease fitting cap could be by way of installing such a cap on each grease fitting to protect that grease fitting against the introduction of foreign material which could ultimately cause a failure. Another aspect of the use of the device would be to install the cap temporarily on a leaking fitting until such time that the machinery can be shut down so that the lubrication fitting can be replaced. In either case, the device can be easily removed in the event one desires to perform lubrication while the machinery is operating under internal pressure.

DESCRIPTION OF THE DRAWINGS

Other and further advantageous features of the present invention will hereinafter more fully appear in connection with the detailed description of the drawings, in which:

FIG. 1 is a perspective exploded view of a button-head grease fitting and a grease fitting cap embodying the present invention.

FIG. 2 is a bottom or end side plan view of the housing or body of the cap.

FIG. 3 is a side view of the housing or body of FIG. 2.

FIG. 4 is a sectional side view of the bolt portion of the cap embodying the invention.

FIG. 5 is a side view of the cap installed on the button-head fitting, shown partially in section.

DESCRIPTION OF THE PREFERRED EMBODIMENT

Referring to the drawings in detail, reference character 10 generally indicates a grease fitting cap for use with a button-head type grease fitting generally indicated by reference character 12.

The button-head type grease fitting 12 generally comprises a bolt like member having a threaded shank portion 14 and a hexagonal shaped wrenching element 16 at one end thereof. Extending from the wrenching element 16 on the opposite side from the shank member is a cylindrical portion 18 having a circular or disc shaped flange member 20 which forms the "button-head" portion of the fitting. The entire fitting 12 is provided with a longitudinal central bore 22 therethrough which contains a check valve 24 therein. Normally, in use the threaded shank portion 14 is secured within a threaded bore in the machinery (not shown) to be lubricated and is tightened therein by means of the wrenching element 16, thereby leaving the button-head portion 20 exposed for the introduction of lubricant therethrough. Normally, the button-head fitting is provided with a rather flat outer face portion 26 surrounding the grease introduction port 22.

Lubrication is performed by utilizing a grease gun or the like (not shown) which can be attached to the button-head portion 20 of the fitting and lubricant being forced through the grease introduction port or bore 22 overcoming the force of the check valve 24 and, in turn, the internal pressure of the machinery being lubricated.

The grease fitting cap 10 embodying the present invention generally comprises a housing or body 28 which is provided with an internal transverse cavity 30 which extends into the central portion of the housing 28. Partially surrounding the end of the cavity 30 is an inwardly directed flange member 32 for a purpose that will be hereinafter set forth. Both the cavity 30 and the flange member 32 are open at one side of the housing 28 for receiving button-head portion 20 of the fitting therein.

The outer periphery of the housing or body member 28 has a hexagon cross-sectional shape for a purpose that will be hereinafter set forth.

The housing further comprises a longitudinal threaded bore 34 therethrough which extends from the opposite end of the body 28 through and into open communication with the cavity 30. The grease fitting cap 10 further comprises a bolt member 36 having a threaded shank portion 38. One end of the shank portion 38 is provided with a bolt head 40 which is normally of hexagonal shape for manipulation thereof by a wrench device (not shown). The end face 41 of the shank 38 opposite the bolt head portion 40 is provided with an angular O-ring groove 42 therein. The portion of the end face 41 which is inside the O-ring groove 42 is recessed to form a face 44 which is parallel to the end face 41. This recess portion 44 causes the O-ring groove to have an outer sidewall 46 which is wider than the inner sidewall 48.

An O-ring 50 of suitable material is insertable within the O-ring groove 42.

The grease fitting cap may be utilized on the button-head grease fitting whether or not there is a leak in the fitting. When so attached to the fitting, the cap member will protect the fitting from exposure to foreign material or may even retard corrosion in addition to retention of the internal pressure even if the check valve within the grease fitting fails. Another obvious use is to stop a leaking grease fitting either permanently or temporarily until such time as the lubrication fitting can be replaced.

To attach the device to the grease fitting, the bolt member 36 is backed out of the cavity 30 and the housing 28 is then slid onto the button-head portion 20 of the grease fitting whereby the flange 32 partially surrounds the cylindrical portion 18 of the grease fitting.

The bolt member 36 then is rotated to advance the O-ring seal 50 into contact with the flat face portion 26 of the grease fitting whereby the O-ring completely surrounds the lubrication introduction port 22. A wrench or other device may be attached to the body portion 28 to prevent rotation while another wrench may be attached to the hexagonal shaped head 40 for firmly tightening the O-ring seal portion into contact with the button-head portion of the grease fitting.

Tests have been conducted resulting in this cap stopping leaks at pressures in excess of 10,000 pounds per square inch. The cap can easily be removed by a reversal of the above process.

From the foregoing it is apparent that the present invention provides a cap specifically adaptable for use with button-head type grease fittings to stop leaks through those fittings and to further protect the fitting from the introduction of foreign material and corrosion which would reduce the life of the fitting.

Whereas, the present invention has been described in particular relation to the drawings attached hereto, other and further modifications apart from those shown or suggested herein may be made within the spirit and scope of the invention.

I claim:

1. A grease fitting cap for use with button-head grease fittings which have a disc shaped button-head portion containing a central port in the outer face of the button-head portion and an annular groove around the button-head portion longitudinally offset from the face thereof, the cap comprising:
   a housing, first means carried by the housing for removably attaching the housing to the button-head portion of the grease fitting utilizing the annular groove therearound, second means carried by the housing and movable with respect thereto, annular seal means carried by the second means and contactable with the outer face of the button-head portion surrounding the port thereof for sealing said port from leakage and contamination.

2. A grease fitting cap for use with button-head grease fittings for sealing and protecting the port thereof, the cap comprising:
   (a) a cap housing having a central cavity at one end thereof, inwardly extending flange means carried by the housing and extending into the cavity, an opening in one side of the cavity and the flange means for receiving the button-head portion of the grease fitting therein, a longitudinal threaded bore through the housing into open communication with the cavity;
   (b) a bolt member having a threaded shank, an operator member at one end of the shank and an O-ring groove in an end face of the opposite end of the shank; and
   (c) an O-ring seal member carried by the O-ring groove for contacting the button-head portion of the fitting surrounding the port thereof for sealing the port when the bolt member is threadedly tightened thereagainst.

3. A grease fitting cap as set forth in claim 2 wherein the bolt operator member is a bolt head having a wrenching element shape.

4. A grease fitting cap as set forth in claim 2 wherein the cavity is transversely extending into the housing, the flange means partially surrounding the cavity to form a shoulder portion for engaging the button-head portion of the grease fitting, said shoulder portion prohibiting removal of the housing longitudinally with respect to the fitting.

5. A grease fitting cap as set forth in claim 2 wherein the O-ring groove in the end face of the bolt shank is centrally disposed and the end face portion inside the O-ring groove is recessed such that the outer wall of the O-ring groove is wider than the inner wall to prevent blowout of the O-ring seal member.

* * * * *